United States Patent
Leitch et al.

(10) Patent No.: US 10,607,185 B2
(45) Date of Patent: Mar. 31, 2020

(54) PLANT DELIVERABLE MANAGEMENT SYSTEM

(75) Inventors: James S. Leitch, Anderson, SC (US); Bruno C. Storino, Simpsonville, SC (US); James B. Humphries, Greenville, SC (US); Dustin Bohard, Collinsville, OK (US); Mike McGee, Greer, SC (US)

(73) Assignee: Fluor Technologies Corporation, Sugar Land, TX (US)

( * ) Notice: Subject to any disclaimer, the term of this patent is extended or adjusted under 35 U.S.C. 154(b) by 975 days.

(21) Appl. No.: 13/516,181

(22) PCT Filed: Dec. 15, 2010

(86) PCT No.: PCT/US2010/060535
§ 371 (c)(1),
(2), (4) Date: Apr. 4, 2013

(87) PCT Pub. No.: WO2011/075528
PCT Pub. Date: Jun. 23, 2011

(65) Prior Publication Data
US 2013/0191302 A1   Jul. 25, 2013

Related U.S. Application Data

(60) Provisional application No. 61/287,317, filed on Dec. 17, 2009.

(51) Int. Cl.
*G06Q 10/10* (2012.01)
*G06Q 10/06* (2012.01)

(52) U.S. Cl.
CPC ............. *G06Q 10/10* (2013.01); *G06Q 10/06* (2013.01)

(58) Field of Classification Search
CPC ......... G06Q 10/00; G06Q 10/06; G06Q 10/10
See application file for complete search history.

(56) References Cited

U.S. PATENT DOCUMENTS

| | | | |
|---|---|---|---|
| 5,826,252 A | 10/1998 | Wolters, Jr. et al. | |
| 6,633,869 B1 | 10/2003 | Duparcmeur et al. | |
| 7,162,427 B1 | 1/2007 | Myrick et al. | |
| 7,188,072 B2 | 3/2007 | Eichstaedt et al. | |
| 8,595,044 B2 * | 11/2013 | Bernardini | G06F 8/70 705/7.14 |
| 2003/0093472 A1 * | 5/2003 | Warren | G06Q 10/06 709/203 |
| 2004/0024662 A1 | 2/2004 | Gray et al. | |
| 2004/0039972 A1 * | 2/2004 | Chung | G06Q 30/06 714/100 |
| 2007/0124373 A1 * | 5/2007 | Chatterjee | G06Q 10/10 709/204 |

(Continued)

Primary Examiner — Maria C Santos-Diaz
(74) Attorney, Agent, or Firm — Conley Rose, PC (57) ABSTRACT

A plant deliverable management system is presented. The system leverages plant construction agnostic templates to generate plant deliverables (e.g., training materials, inspections, reports, design drawings, etc.). The plant deliverables can be converted from common, a generic format to a format desired by a client paying for the plant construction. The system can also provision a computer system with a released version of plant deliverables where the deliverables are indexed according to a derived indexing scheme generated based on the templates and a client's desired formats or asset attributes.

17 Claims, 5 Drawing Sheets

(56) References Cited

U.S. PATENT DOCUMENTS

| | | |
|---|---|---|
| 2007/0294954 A1 | 12/2007 | Barrett et al. |
| 2008/0133029 A1 | 6/2008 | Heimke et al. |
| 2009/0100769 A1 | 4/2009 | Barrett et al. |
| 2009/0125359 A1 | 5/2009 | Knapic et al. |
| 2009/0254401 A1* | 10/2009 | Blanchard .............. G06Q 10/00 705/7.27 |
| 2009/0282067 A1 | 11/2009 | Bendigeri et al. |
| 2009/0292514 A1 | 11/2009 | McKim et al. |
| 2009/0300083 A1 | 12/2009 | Herold et al. |

* cited by examiner

PLANT DELIVERABLE MANAGEMENT SYSTEM

This application claims the benefit of priority to U.S. provisional application Ser. No. 61/287,317 filed on Dec. 17, 2009. These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is data aggregation and management technologies.

BACKGROUND

Building of a plant (e.g., power plant, factory, buildings, processing plant, etc.) represents many Herculean efforts directed to resource acquisition, logistics, construction, and delivery of a final plant to its new owners. One aspect of delivering a plant to a new plant owner includes aggregating and presenting operations documentation and data to the owner. Operations documentation can include design documents, operation manuals, part lists, training materials, human resource requirements, or other forms of data.

Currently in the plant construction industry, each plant construction project is treated as a single stand alone project with its own set of documentation deliverables. When a new construction started, all new plant deliverables are built from scratch. Even large construction corporations fail to leverage documentation delivery requirements from one project to the next project in a sensible manner.

What has yet to be appreciated is a documentation deliverable engine can be provided to engineering firms, construction firms, EPCM firms, or other firms having substantial document delivery requirements to address the issues discussed above. The deliverable engine can be configured to aggregate data and maintain deliverable documentation requirements across multiple construction projects. Such an engine can be configured to allow the myriad of individuals involved in a construction project (e.g., design engineers, vendors, trainers, inspectors, etc.) to interact with the engine during all phases of a plant construction. Individuals can supply or access data regarding the plant's operation including maintenance data, support data, manuals data, or other types of operations data. Once a plant is ready for delivery to its new owners, the documentation can be converted to a desired format or formats for presentation to the new owners where the documentation can be placed within a knowledge system tailored to the new owners. Furthermore, the engine and its data or workflow processes can remain in place within the construction firm and can be leveraged as feedback toward the next construction project. Such an approach reduces time and cost for delivery of future plants.

Others have put forth effort to aggregate and deliver data for various purposes. For example, U.S. Pat. No. 7,162,427 to Myrick et al. titled "Structure and Method of Modeling Integrated Business and Information Technology Frameworks and Architecture in Support of a Business" filed Aug. 20, 1999, describes an overall enterprise architecture that includes information technology systems. In addition, U.S. patent application publication to Knapic et al. titled "Integrating a Methodology Management System with Project Tasks in a Project Management System", filed Jul. 9, 2008, describes a project management system capable of generating a project plan based on templates.

Although the above references provide adequate approaches for their specific issues, they fail to fully address document delivery requirements across multiple large scale plant construction projects.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Thus, there is still a need for plant deliverable management systems.

SUMMARY OF THE INVENTION

The inventive subject matter provides apparatus, systems and methods in which one can leverage past experiences on new construction projects to create a deliverable package for the plant construction project one aspect of the inventive subject matter is considered to include a plant deliverable management system. Contemplated systems can include a template engine configured to store one or more construction project agnostic deliverable templates. Each template can also include normalized attributes where the normalized attributes represent a common nomenclature applicable to multiple, distinct projects. Thus the templates and normalized attributes can be leveraged across many different projects. A deliverable interface allows remote users, external users or internal users, to gain access the system and enter deliverable data. In large scale plant constructions, external users can include many different independent third party users possibly from vendors, contractors, sub-contractors, trainers, suppliers, the client (i.e., owner of the new plant), or other types of users. As users enter deliverable data, the deliverable data can be stored within a deliverable library, which can store deliverables for one or more different plant constructions. The deliverable data can be stored according to a client's preferred format. When desired, a deliverable engine can obtain plant deliverables from the deliverable library to provision a deliverable computer system. The deliverable computer system can be outfitted with the deliverables according to the client's preferred formats. In some embodiments, the deliverables can be arranged according to an indexing scheme derived from the client's preferred formats. Furthermore, the deliverable computer system can further include a search engine configured to find plant deliverables according to the indexing scheme.

Various objects, features, aspects and advantages of the inventive subject matter will become more apparent from the following detailed description of preferred embodiments, along with the accompanying drawing figures in which like numerals represent like components.

DETAILED DESCRIPTION

It should be noted that while the following description is drawn to a computer/server based deliverable management system, various alternative configurations are also deemed suitable and may employ various computing devices including servers, interfaces, systems, databases, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including provisioning an external computer system storing plant deliverables for use by a client. The contemplated infrastructure converts project agnostic information into a client-specific knowledge base constructed on a computer system.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Figure 1:
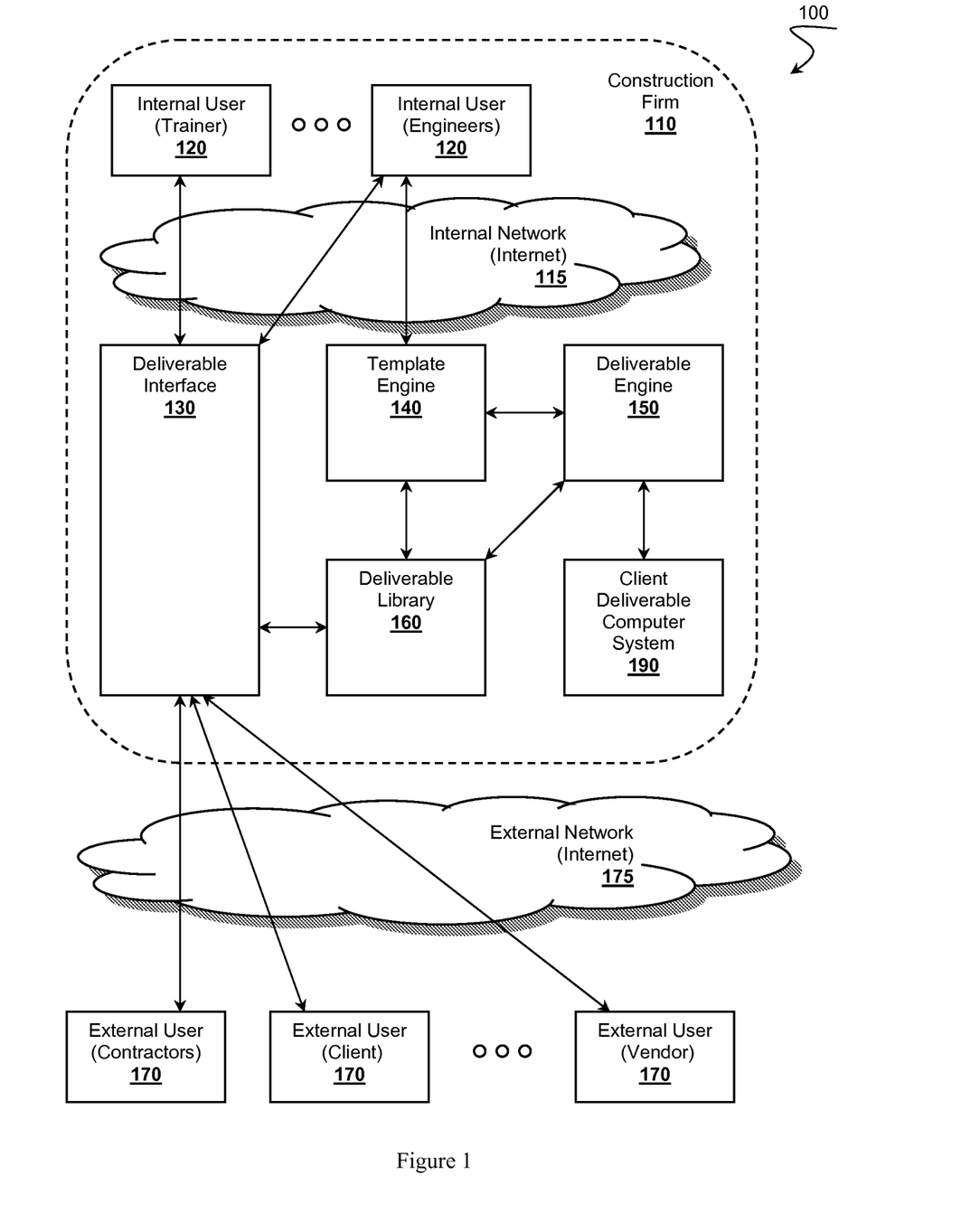
FIG. 1 is a schematic overview of a plant deliverable management system.

In FIG. 1, plant deliverable management system 100 is operated by construction firm 110. One should appreciate that large scale construction firms, FLUOR Corporation for example, span large geographical distances, even across continents. In view of such globe-spanning enterprises internal network 115 of construction firm 110 should be considered to also span across large geographical distances while still being considered internal to construction firm 110. Construction firm 110 represents a firm suitable for taking on large scale plant constructions (e.g., power plants, processing plants, manufacturing plants, etc.) in nearly any jurisdiction or at nearly any geographic location.

Construction firm 110 can include one or more computer-based component working together to provide suitable plant deliverable management system 100 to a client that has engaged construction firm 110 for a plant construction. System 100 can include deliverable template engine 140, deliverable interface 130, deliverable library 160, and deliverable engine 150. The various components of system 100 can be accessed by internal users 120 or even external users 170 via deliverable interface 130. It is noted that each of the components is considered to be computer system functioning as a client or as a server to provide their describe roles or responsibilities.

Internal users 120 representing members of construction firm 110 can access components of system 100 via internal network 115. Internal network 115 can include a corporate network owned or operated by construction firm 110. In some embodiments, internal network 115 can include a WAN, VPN, or other type of communications network, possibly operating as an overlay on the Internet's infrastructure.

In a similar vein external users 170 representing members of independent third parties can access components of system 100 over external network 175. One should appreciate that external network 175 can also comprise the Internet where external network 175 is largely outside control of construction firm 110. Still, construction firm 110 can make deliverable interface 130 accessible to external users 170 as desired. For example, deliverable interface 130 could comprise web-based infrastructure to present web pages, web service APIs, services, or other types of interfaces to external users 170.

The various components of plant deliverable management system 100 are configured to cooperate in creating a deliverable package for a client's plant construction. For example, as internal users 120 or external users 170 enter deliverable data via deliverable interface 130, the deliverable data can be aggregated according to the templates from template engine 140. The aggregated information can be stored as plant deliverables within deliverable library 160, where the plant deliverables are considered to include required or requested documentation to complete handover of the constructed plant to the client. Deliverable engine 150 can obtain the plant deliverables from deliverable library 160 and aggregate them into a deliverable package for the client according to a client's preferred format. In some embodiments, deliverable engine 150 can provision client deliverable computer system 190 with the plant deliverables. For example, computer system 190 can be configured with a database storing the client's plant deliverable documents and a search engine configured to query the database according to a desired indexing scheme.

At any given time, plant deliverable management system 100 can provide plant deliverable services for one or more different plant constructions, or for one or more clients. In view that construction firm 110 can provide construction services across many different clients, the various components of system 100 can preferably operate in a construction project agnostic manner.

Figure 2:
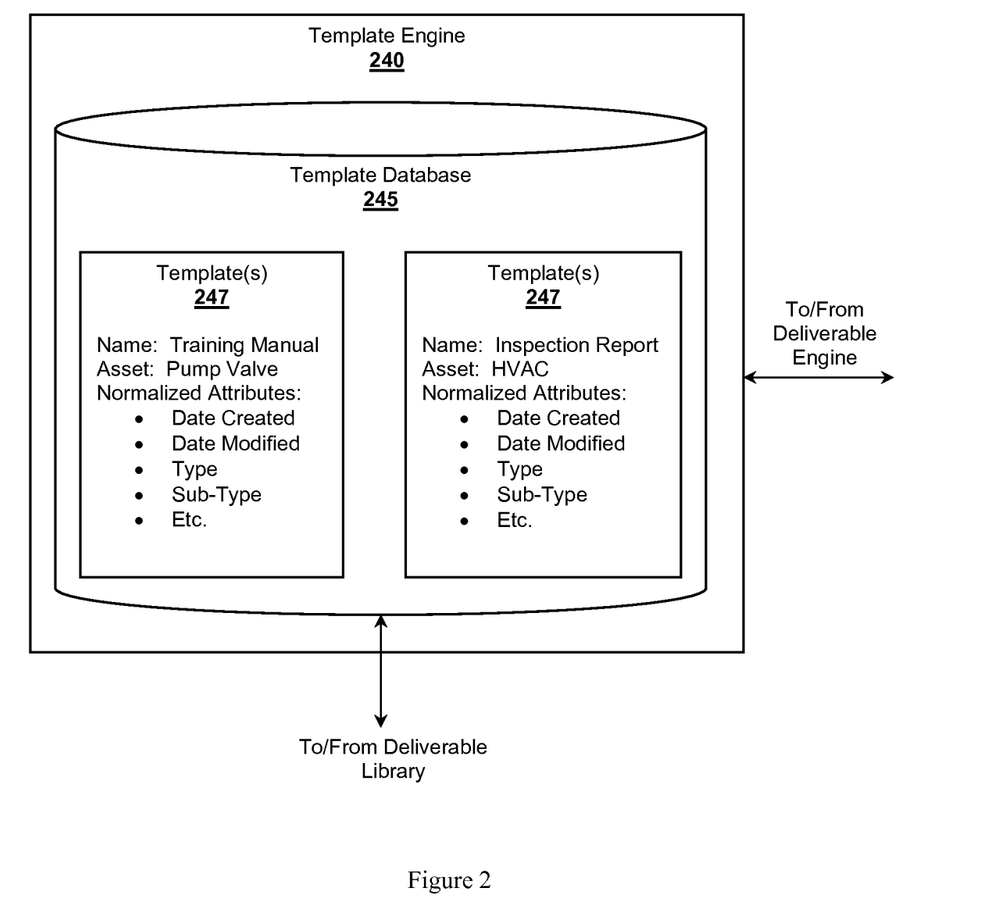
FIG. 2 is a block diagram of a template engine.

FIG. 2 presents a more detailed view of template engine 240, which can be incorporated within a plant deliverable management system. Template engine 240 is configured to store a plurality of project agnostic plant deliverable templates 247 where each template 247 can have template attributes. Template engine 240 can include template database 245 storing one or more deliverable templates 247 where templates 247 can be leveraged by one or more remote users to enter deliverable data. Aggregating deliverable data according to one or more templates 247 allows for the creation of actual plant deliverables. One should note that each distinct plant construction can leverage different sets of templates 247 where the sets used for one plant construction might or might not have leverage the same templates as a second, different plant construction.

Templates 247 can be constructed in a plant construction agnostic manner where each of templates 247 can be leveraged from one plant construction to another. Templates 247 can include various information relating to the deliverable for which it corresponds. For example, templates 247 can include one or more template attributes that a normalized across all projects. Normalized attributes represents data bound to the template having standardized names or possibly values so that members of the system can properly exchange data, information, or others without confusion.

A set of normalized attributes can be organized according to various schemas. For example, normalized attributes can be organized into a hierarchical namespace where each portion of an attribute name corresponds to a level in the hierarchy. Members of a governing body can also assign normalized attributes to templates 247 if necessary or could provide a mapping from client-centric attributes to the normalized attributes. Regardless of how normalized attributes are constructed, normalized attributes are considered to be plant construction agnostic and can apply across multiple distinct projects.

Templates 247 can also include interface information relating to deliverable data that should be made available for a corresponding plant deliverable. The interface information can be used to construct a user interface through which users can enter plant developable data. Templates 247 along with its associated constituent elements (e.g., attributes, interface information, etc.) can be stored within template database 245 as manageable objects which link together. In some embodiments, the various template objects, or other objects in databases, can be stored as XML data structures representing a generic, common intermediary format. When templates 247 are considered useful for a plant construction, the other components of the system can interpret the XML data to determine how to construct an appropriate interface for obtaining deliverable data associated with the template's corresponding deliverable.

Templates 247 can be manually created or automatically created. In some embodiments, a governing body determines the form of template 247 to ensure it conforms to a standard, has elements conforming to standard nomenclature (e.g., normalized attributes, etc.), or otherwise is consistent with other objects in template database 245. Templates 247 can also be constructed, possibly automatically, based on previous project's assets.

An asset library storing asset-level information for one or more previous projects provides the system within information about each project's assets. An asset is considered to include a physical component of a plant construction, which can range from a bolt, up through a processing unit, to a construction site. As projects are completed, assets from one project can be compared to other projects to determine commonality, possibly via normalized attributes conforming to the same namespace as those used in with templates 247. If a template 247 does not exists for an asset, the system can construct a recommended template to meet the needs of providing deliverables associated with an asset. The recommended template can be constructed having features based on the previously generated plant deliverables. For example, an asset, say a pumping station, might lack training materials. A deliverable engine could identify previously provided training materials identified by normalized attribute "training". The engine can then use the training material formats (e.g., table of contents, index, etc.) to construct a template for a pumping station training material deliverable.

Templates 247 can represent many different types of plant deliverables. One should appreciate that each plant deliverable could be required at different phases of a construction project. Example types of plant deliverables include design deliverables, engineering deliverables, construction deliverables, operational deliverables, or even end-of-life or decommissioning deliverables. For example, a design phase deliverable could include equipment lists, instruments lists, loop sheets, layout or arrangement drawings, specifications, requirement documents, or other types of documentation. One should further appreciate that the deliverables can extend beyond engineering or technical documentation. For example, operational deliverables (i.e., document for running a plant) can include training materials, human resource requirements (e.g., skills requirements, hiring requirements, etc.), inspection schedules, classroom tests, or other materials considered useful when operating a plant.

Templates 247 are considered living templates that can be modified as time passes. As lessons are learned from one plant construction to another, best practices can be incorporated into the templates to ensure continual improvement over time. As templates 247 stabilize or achieve approval, they can be made available or otherwise released via template database 245.

Figure 3:
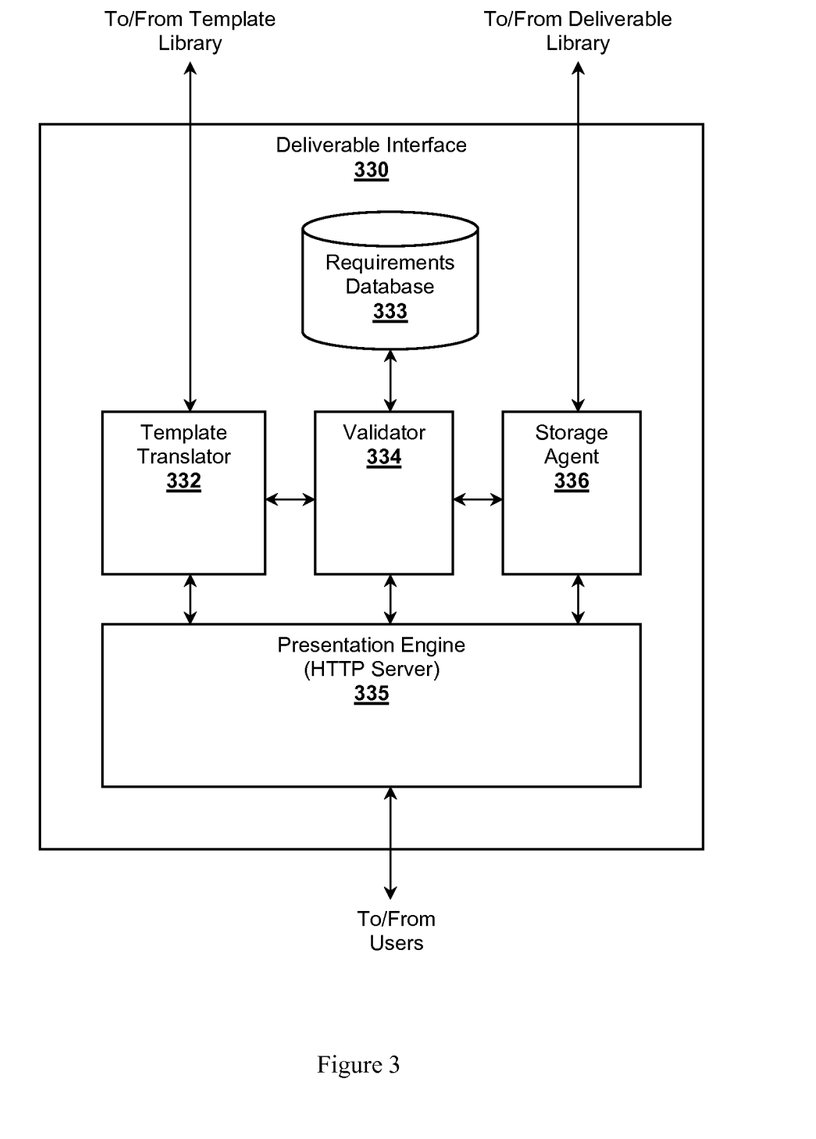
FIG. 3 is a block diagram of a deliverable interface.

As a plant construction is underway, regardless of the phase of the project, users can provide deliverable data to the plant deliverable management system. FIG. 3 illustrates a deliverable interface 330 which couples to the template engine and is configured to allow remote users to enter plant deliverable data according the plant deliverable templates associated with the plant construction. Deliverable interface 330 can take on many different forms to meet the needs of remote users. In the example show, deliverable interface 330 is constructed as a web server capable of rendering user interfaces on remote computers. However, deliverable interface 330 could also present one or more application programming interfaces (APIs) that computers can call. In such an embodiment the remote computers can also run a local application or software to create a user interface, which in turn couples with the other components of the plant deliverable management system.

Deliverable interface 330 can include a template translator 332, which can obtain template information for a deliverable. Template translator 332 can interpret the various data stored within a template (e.g., normalized attributes, XML, HTML, etc.) to generate instructions for rendering a user interface for a deliverable corresponding to the template. For example, a template for a checklist might include a plurality of fields that a user must name according to a client's desired nomenclature or language. Consequently, template translator 332 might construct a user interface having a plurality of input fields where a user enters names or values corresponding to required fields.

Presentation engine 335 can use the instructions from template translator 332 to render a desired user interface. Although presentation engine 335 is presented as an HTTP server that renders a web page, presentation engine 335 could also be configured to generate more than one type of interface. For example, presentation engine 335 could also create HTML code, spreadsheets, database schemas, application interfaces, APIs, or other types of user interface constructs. The type of user interface can depend heavily one the type of deliverable represented by a template. Some deliverables lend themselves to spreadsheet entry (e.g., equipment lists, checklists, etc.), while others lend themselves to database entry (e.g., work-flows, inspection results, etc.), and still others lend themselves to raw data entry or file entry (e.g., video inspections, audio data, etc.).

Users interact with deliverable interface 330 to enter deliverable data into the deliverable management system. Deliverable data can include a wide variety of information. One especially preferred type of information includes asset-level information that specifically relates to a physical objects or assets of a specific construction project. Asset-level information relates to specific assets for a project and can comprise many different types of data. Examples include preventative maintenance/predictive management data, calibration schedules, load level, job plans, build automations, BOM equipment part lists with part lifetime information, or other types of data related with specific physical assets of a plant.

Deliverable interface 330 can also include validator 334, which can be configured to validate the deliverable data entered into the system. Validator 334 can consult requirements database 333 for requirements associated with the plant construction to achieve an understanding of the requirements for deliverable data. Requirements can include client preferred formats, language requirements, legal requirements (e.g., certifications, notarization, ratifications, etc.), safety requirements, or other types of requirements. As a minor example, validator 334 could verify that information is entered in a correct language. As with other components of the system requirements database 333 can store requirements across multiple distinct plant constructions.

In addition to requirements database 333, validator 334 can also obtain validation information from templates. As a user interface is constructed from a template via template translator 332, validator 334 can determine if the entered data does indeed meet the criteria outlined in the template. For example, a template might require that a field should include a pointer to an audio file. Validator 334 can check the audio data to determine if it is in one or more recognizable audio file formats. Data type validation represents one form of validation that can be achieved through consulting with template requirements. Other types of validation can include authorization information for a user or entity to which the user is a member, verifying schedule requirements, validating that entered data entered has valid mappings to normalized attributes, or other types of validations.

In view that validator 334 has access to information relating to valid uses of a template, plant construction requirements, normalized attributes, or client preferences (e.g., client language, formats, attributes, etc.), validator 334 can also provide recommendations, possibly in real-time, to users entering deliverable data where the recommendations reflect possible modifications to the deliverable data so that the deliverable data would be in compliance with data entry requirements. The data entry requirements can be on plant construction requirements in requirements database 333, templates related to the plant construction or corresponding deliverable, or other requirements. Consider a scenario where a user uploads raw image data of an inspection site. Validator 334 could provided feedback to the user suggesting that the image data should be converted from a first format, JPEG for example, to a second format, PNG for example. Furthermore, validator 334 via presentation engine 335 could offer the user the option to automatically convert the image data. In such a scenario, validator 334 or deliverable interface 330 can include data format conversion utilities.

Validator 334 can also provide suggestions on data entry. As a user is entering data, validator 334 can provide recommended attributes having valid mappings to normalized attributes that would be considered available for the derivable data. For example, when entering inspection data relating to a pump, the user can be prompted with valid normalized attributes that corresponds to pump assets and that might have been ratified by a governing body. Thus, validator 334 ensures consistency of data entry across myriad independent third party users.

Once deliverable data has been entered via deliverable interface 330 or validated via validator 334, the deliverable data can be submitted for storage via storage agent 336. Storage agent 336 represents a module configured to exchange deliverable data with a deliverable library database. Storage agent 336 can interact with the database according suitable query languages, APIs, or other database techniques. For example, storage agent 336 can be configured to interface with remote databases via SQL commands or other types of query languages.

In some embodiments, storage agent 336 and presentation engine 335 form an interface to a version control system. Thus deliverable data can be submitted over time where a signal deliverable could have multiple versions. Example suitable version control systems that could be adapted for use include CVS, Subversion, Git, Perforce™, or other existing version control systems.

Deliverable interface 330 can be further configured to authorize users of the system. As users access deliverable interface 330, the user can be authenticated to determine if they are an internal user having rights associated with a construction firm or operator of the system, or are an external user having appropriate restricted rights to enter deliverable data. In more preferred embodiments, deliverable interface 330 allows two or more independent third party users to enter plant deliverable when the users are authorized as members of their respective entities. For example, one user could be authorized as a member of a government inspection agency while another user could be authorized as a member of a vendor. Each user would be restricted to only enter deliverable data based on their entity's roles or responsibilities.

Figure 4:
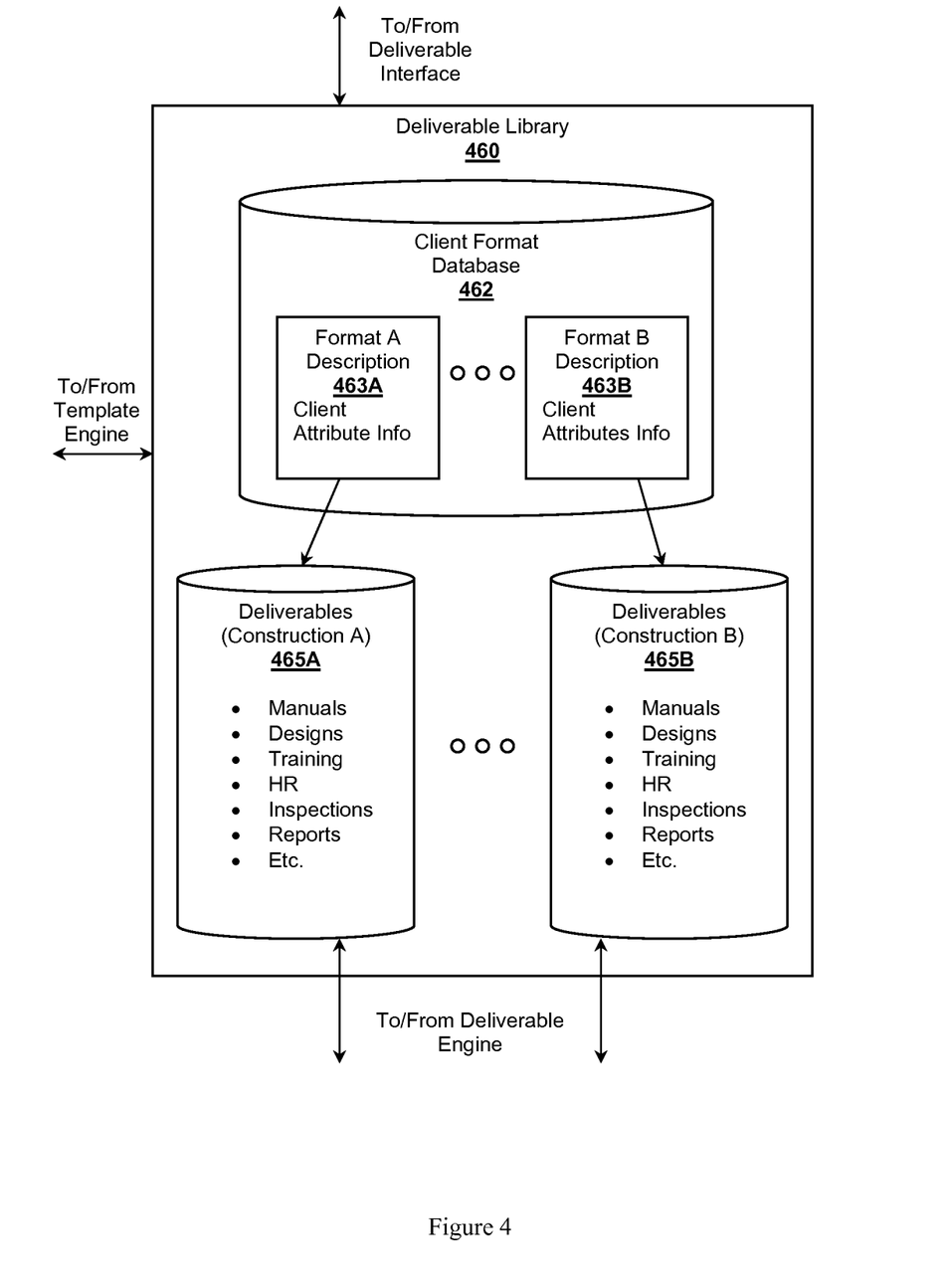
FIG. 4 is a block diagram of a deliverable library.

Deliverable data can be submitted to a deliverable library as represented by FIG. 4. Deliverable library 460 is preferably configured to store a plurality of plant deliverables relating to the plant construction and to have access to a client's preferred formats. The plant deliverables can be derived from the plant deliverable data and plant deliverable templates. Deliverable library 460 can store deliverable across multiple plant constructions even for different clients.

Deliverable library 460 can include client format database 462 storing client preferences for plant construction deliverable. For example, client format database 462 can store format description 463A for a first client associated with a first plant construction, while also storing format description 463B for a second client associated with a second, different plant construction. Although the first and second client could be different clients, it is also possible that they could be the same client having slightly different requirements for the respective plant constructions.

Format descriptions 463A through 463B represent information defining how their respective clients wish to interface with their respective deliverables 465A through 465B, respectively. Format descriptions 463A and 463B can include desired data file formats, attribute mappings to normalized attributes, user authorizations, or other information. Example data file formats could include Microsoft Office® formats, OpenOffice™ formats, video formats (e.g., DIVX, MPEG4, etc.), audio formats (e.g., MP3, OGG, etc.), or other types of data formats. Naturally each format description could include different desired formats. In addition attribute mappings can include rules for converting to and from the normalized attributes to client's preferred attributes. Such an approach is considered advantageous when localizing deliverable data for various jurisdictions around the globe according to one or more languages. One should note the attributes mappings can be quite complex extending beyond a mere one-to-one mapping. For example, a client's preferred set of attributes might carry a higher level of abstraction than that exhibited by the normalized attributes so that more than one type of normalized attribute maps to a single client-level attribute according to defined mapping rules.

Deliverable library 460 can also include one or more databases storing deliverables 465A through 465B representing the deliverables required for their respective plant constructions. Each of deliverables 465A through 465B comprises documents that were requested or required by a client before the client takes over operation of the constructed plant.

One should considered each of the deliverables 465A through 465B as living repositories where the various documents can be modified at any time throughout the lifetime of the plant construction or through the various phases of the plant construction's life-cycle (e.g., inception, design, engineering, construction, commissioning, operation, decommissioning, etc.). Furthermore, deliverables 465A through 465B can be under version control in a manner where individual documents, collections of documents, or an entire deliverable package can be checked in or checked out during construction of a deliverable package.

Although deliverable library 460 houses deliverable 465A through 465B, there is no requirement that the deliverables 465A through 465B conform to format descriptions 463A and 463B as deliverables 465A through 465B are considered works in progress until released to the client. In some embodiments, deliverables 465A through 465B can be stored in a generic common format, XML for example, that is client or plant construction project agnostic. Still, deliverables 465A through 465B could adhere to the client's preferred formats if desired.

Figure 5:
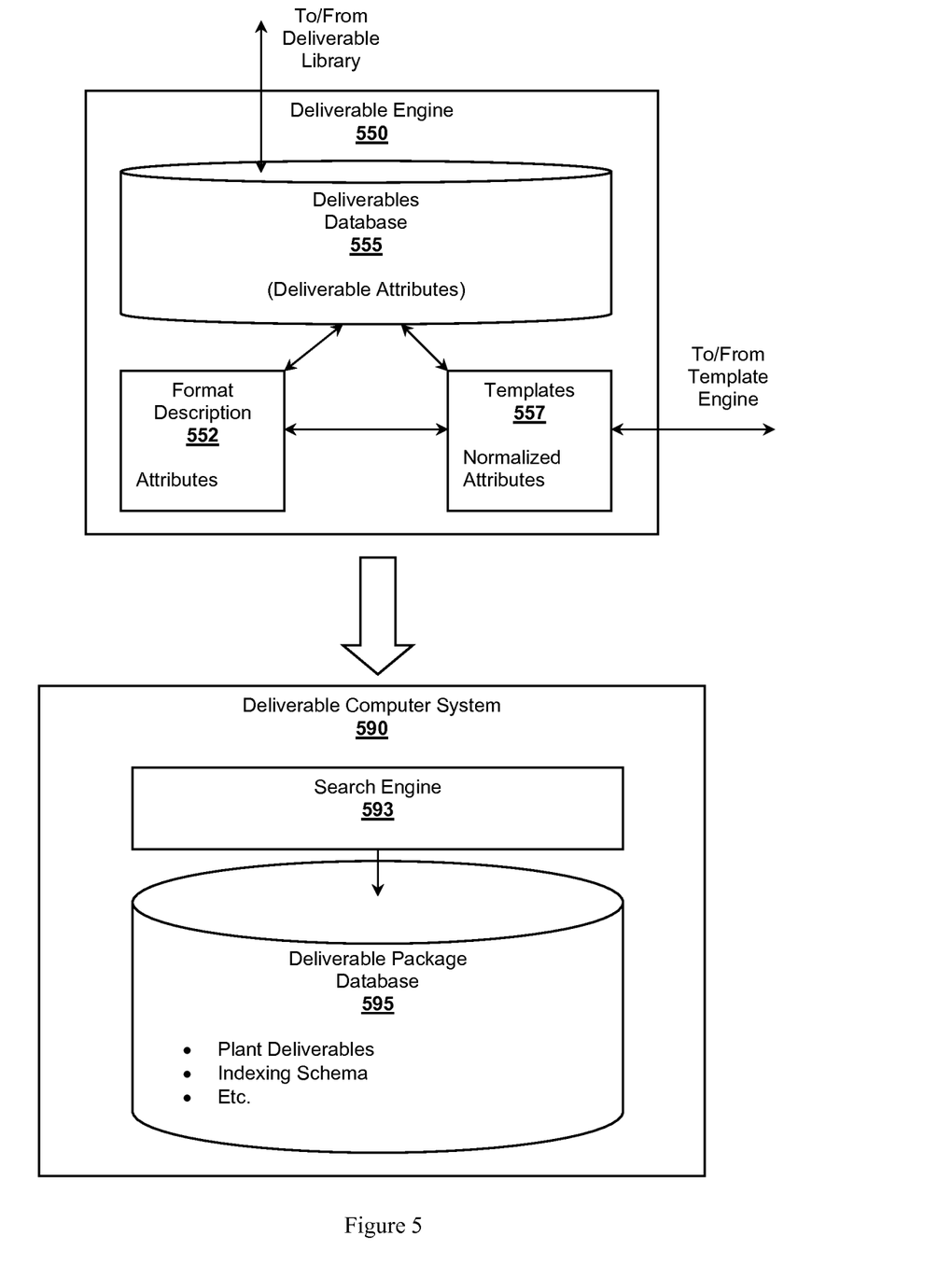
FIG. 5 is a block diagram illustrating a deliverable engine and a provisioned deliverable computer system.

FIG. 5 illustrates deliverable engine 550, which couples to the deliverable library and is configured to automatically provision deliverable computer system 590 with deliverable package 595 comprising the plant construction deliverables stored according to the client's preferred format at outlined by format description 552. In the example shown, deliverable engine 550 builds deliverable database 555 representing all required or requested documents as deliverable package 595. Deliverable data 555 can be as simple as a file system having directories storing the various deliverables or as complex as a relational database following an intricate schema. Deliverable engine 550 utilizes format description 552 obtained from the deliverable library, templates 557 from template library, or other information to construct deliverable database 555.

Of particular note, deliverable engine 550 can convert the deliverables from their generic, common format as stored in the deliverable library to a desired format. Each document, as required by format description 552, can be converted according to rules within format description 552. For example, each deliverable could be stored in the deliverable library as an XML data object. When constructing deliverable database 555, the deliverable can be converted to a proper file format, a Word document or spreadsheet for example. In a similar approach deliverable engine 550 can also map each deliverable's attributes from normalized attributes to attributes desired by the client. Thus, deliverable database 555 meets with a client's expectation or requirements.

Once deliverable database 555 has been suitably prepared, a client's deliverable computer system 590 can be provisioned. Deliverable database 555 can be migrated from deliverable engine 550 to computer system 590, which can take on many different forms. In some embodiments, deliverable computer system 590 can be a separate, distinct computer that can be shipped to a client. While in other embodiments, deliverable computer system 590 can be a remote a priori existing computer located a client's facility and provisioned over an external network. Still, in yet other embodiments, deliverable computer system could be hosted on a plant construction management system possibly operated by the construction firm. Each of the many possible approaches for constructing deliverable computer system 590 has its merits where client can determine which approach, alone or in combination, would best serve their purposes.

Deliverable computer system 590 can include deliverable package 595, which corresponds to deliverable database 555. Deliverable package 595 represents a released version of the plant construction's deliverable to the client. In addition, deliverable package 595 represents a database storing the deliverables according the client's desired formats. Furthermore deliverable engine 550 can utilize converted attributes to construct a client indexing scheme tailored to the client and can annotate the deliverables with the attributes adhering to the indexing scheme.

The client indexing scheme can be derived from the client's preferred deliverable format and the template attributes. The indexing scheme can be constructed during the process of converting the deliverables from their generic format to the client's desired format. As each deliverable is analyzed, its normalized attributes can be converted to the client's preferred attributes according to mappings found in templates 557 or format description 552. When the deliverable is finalized, it can be tagged with the client-specific attributes. Furthermore, the arrangement of the client attribute namespace or topology reflecting the structure of the indexing scheme can be constructed according the mapping rules as well so that the client is not required to following the conventions of the normalized attributes as utilized by the construction firm.

The indexing scheme provides a search infrastructure by which clients can search through their plant deliverables. In view that the deliverables include asset-level information, the indexing scheme can be derived directly from each of the deliverable asset attributes. For example, the indexing scheme could group all pumps by attribute "pump", or could establish relationships between assets and deliverables. Another example includes indexing training materials based on their corresponding assets.

Deliverable engine 550 can also provision deliverable computer system 590 with search engine 593. Search engine 593 preferably provides an interface through which the client or possibly an application can submit queries to the search engine to find relevant deliverables of interest. Search engine 593 can be configured to construct queries (e.g., SQL commands) according the indexing scheme generated by deliverable engine 550. The queries can be submitted via a user interface, via an API, or other suitable interface.

Another responsibility of deliverable engine 550 can include recommending updates to templates 557 for submission back to the system for future use. Deliverable engine 550 can compare a released deliverable to a corresponding template to determine if differences exist. If so, possibly based on frequency of occurrence of the differences across plant constructions, deliverable engine 550 can recommend modifying the corresponding template 557. Recommended modifications can include additional features to be added to the template, features to be removed from the template, changes to normalized attributes of the template, or even a newly generated plant deliverable template derived from asset data of the plant construction.

The reader is reminded that plant deliverables comprise asset-level data reflecting information about the physical assets of the plant construction. Given that each plant construction has its own unique issues; it is contemplated that deliverables for a plant construction might not have an a priori defined template 557. Therefore, the asset-level data can be reviewed for a plant construction to generate a new template. The new template can inherit attributes, fields, or other features from the deliverable. Furthermore, the features can be converted back to a normalized form used by the system. For example, the new templates normalized attributes can be derived from the asset data. The newly created template can become available, upon any required approval, immediately for future projects.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A plant deliverable management system, comprising:
   a computer device comprising:
     a template engine configured to store a plurality of project agnostic plant deliverable templates for use in dissimilar types of plant construction projects in a database, each template having template attributes that are normalized across the plant construction projects;
     a deliverable library configured to store a plurality of plant deliverables relating to a plant construction project and to store a client's preferred deliverable format, each of the plurality of plant deliverables being derived from plant deliverable data and the plurality of project agnostic plant deliverable templates;
     a deliverable interface constructed as a web server on the computer device and configured to render a user interface on a remote computer located in a deliverable computer system via an external network, wherein the deliverable computer system is separate and distinct from the computer device, wherein the deliverable interface is configured to:
       i) allow a user, via the user interface, to enter and store plant deliverable data in the deliverable library according to a subset of the plurality of project agnostic plant deliverable templates, wherein the subset is associated with the plant construction project, and wherein the plant deliverable data is associated with different phases of the construction project;
       ii) determine an entered attribute of the plant deliverable data entered by the user does not have a valid mapping to a normalized attribute in the plurality of project agnostic plant deliverable templates;
       iii) provide a recommended attribute having a valid mapping to the normalized attribute for the plant deliverable data to the user interface rendered on the remote computer in the deliverable computer system, in real-time via the external network;
       iv) receive recommended plant deliverable data having the recommended attribute from the remote computer via the external network; and
     a deliverable engine configured to automatically provision a deliverable package from the web server to the deliverable computer system via the external network,
     wherein the deliverable package comprises a plant construction's plant deliverables which are converted by the deliverable engine from a generic format stored by the deliverable library to the client's preferred deliverable format.

2. The system of claim 1, wherein the deliverable interface is configured to allow two or more independent third parties to enter plant deliverable data upon authorization as members of their respective entities.

3. The system of claim 1, wherein the deliverable interface is further configured to validate entered plant deliverable data against the plurality of project agnostic plant deliverable templates and plant construction requirements.

4. The system of claim 3, wherein the modification to the plant deliverable data brings the plant deliverable data into compliance with the deliverable templates and plant construction requirements.

5. The system of claim 1, wherein the deliverable engine is further configured to recommend deliverable templates updates based on differences between the deliverable package and the plurality of project agnostic plant deliverable templates related to the construction project.

6. The system of claim 5, wherein the deliverable engine is further configured to generate a new plant deliverable template derived from asset data of the plant construction.

7. The system of claim 6, wherein the new plant deliverable template comprises normalized attributes derived from the asset data.

8. The system of claim 1, wherein the deliverable engine is further configured to derive a client indexing scheme based on the client's preferred deliverable format and the template attributes.

9. The system of claim 8, wherein the client indexing scheme is translated from deliverable template attributes.

10. The system of claim 8, wherein the deliverable computer system is configured to be searchable according to the client indexing scheme.

11. The system of claim 8, wherein the plant construction's plant deliverables comprises asset-level information relating to assets of the plant construction.

12. The system of claim 11, wherein the indexing scheme is derived from asset attributes.

13. The system of claim 1, wherein the deliverable computer system is shipped to the client.

14. The system of claim 1, wherein the deliverable computer system is located at the plant and provisioned by the deliverable engine over the external network.

15. The system of claim 1, wherein the deliverable package comprising the plant construction's plant deliverables in the client's preferred deliverable format is used in a delivery of a plant to a client.

16. The system of claim 1, wherein the deliverable computer system is separate and distinct from the computer device.

17. The system of claim 1, wherein the plant deliverable data includes asset-level information that specifically relates to physical objects or assets of the plant construction project.

* * * * *